No. 643,728. Patented Feb. 20, 1900.
M. PAYNE.
RACING SULKY.
(Application filed May 13, 1899.)
(No Model.) 2 Sheets—Sheet 2.
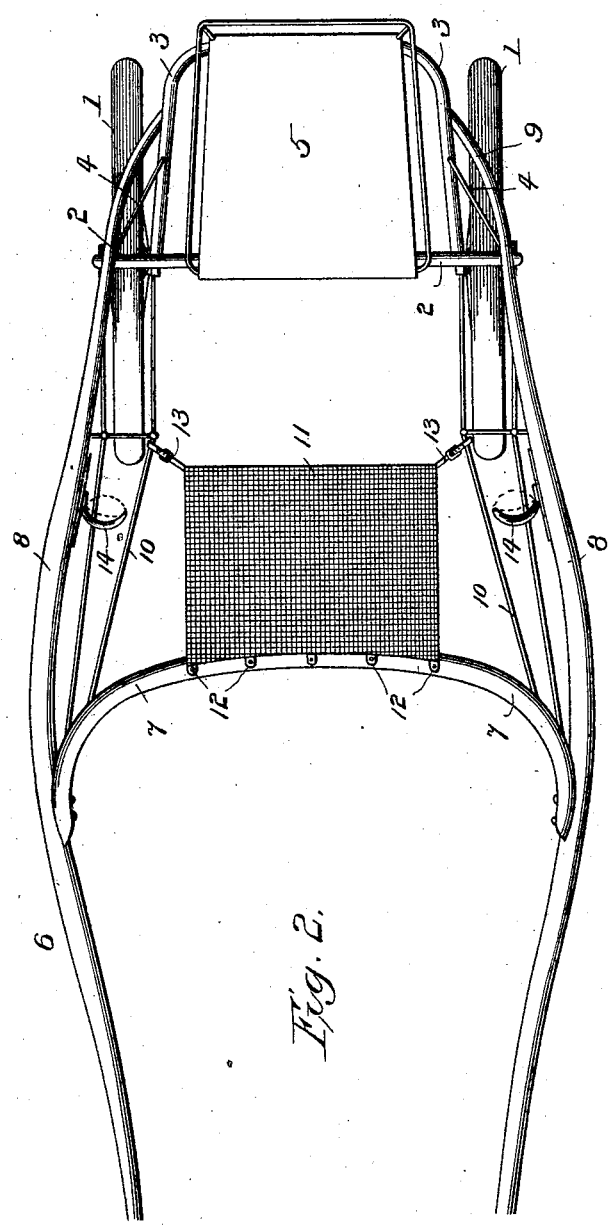
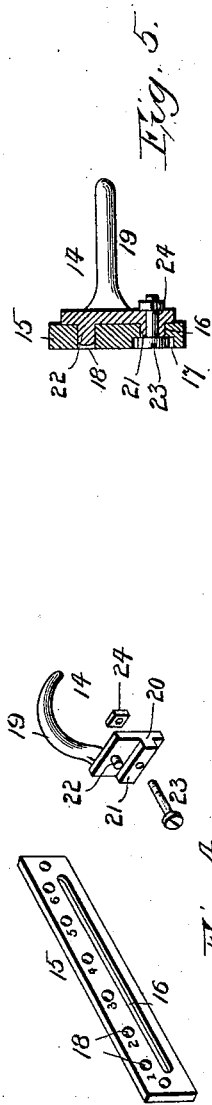
Witnesses
John Enders jr.
E. J. McLeoven.
Inventor
Martin Payne
by
Harry Spalding & Sons Attorneys

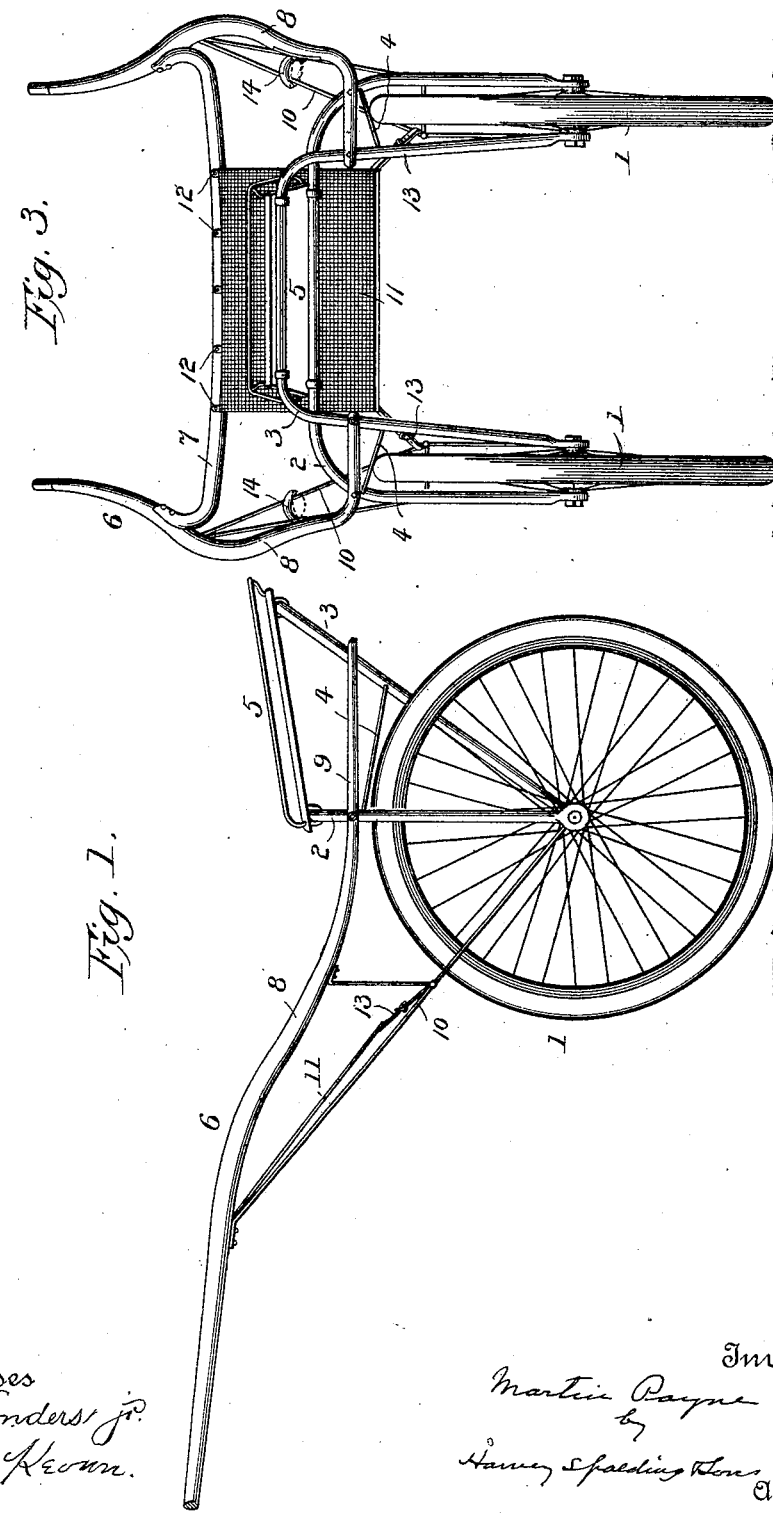

UNITED STATES PATENT OFFICE.

MARTIN PAYNE, OF TROY, NEW YORK.

RACING-SULKY.

SPECIFICATION forming part of Letters Patent No. 643,728, dated February 20, 1900.

Application filed May 13, 1899. Serial No. 716,666. (No model.)

*To all whom it may concern:*

Be it known that I, MARTIN PAYNE, a citizen of the United States, residing at No. 161 Second street, Troy, in the county of Rensselaer and State of New York, have invented certain new and useful Improvements in Racing-Sulkies; and I do hereby declare the following to be a full, clear, and exact description of the invention, such as will enable others skilled in the art to which it appertains to make and use the same.

The present invention relates to racing-sulkies.

My object is to reduce the size and weight and enhance the speed of this class of vehicles and dispose the driver more advantageously both for his own comfort and safety and the speediness of the vehicle than has been done heretofore. This object is accomplished by the provision of certain improvements in the sulky-frame, dust-guard, foot-rests, and other features, as fully and clearly set forth in the following description and recited in the appended claims.

In the accompanying drawings, Figure 1 is a side elevation; Fig. 2, a plan view; Fig. 3, a rear elevation, and Figs. 4 and 5 details of the foot-rest.

The wheels 1 are of the usual pneumatic type, and 2 and 3 are arched front and rear axles, respectively, the front axle being perpendicular and having its ends connected to the outer ends of the wheel-spindles and the rear axle being inclined backwardly and connected to the inner ends of the spindles. These axles are strengthened by the stays 4. The driver's seat 5 has its ends supported on the tops of the front and rear axles and is somewhat inclined, owing to the rear axle extending higher than the front one. The front and rear axles are comparatively narrow, so that the wheels are brought much closer together than in the ordinary sulky, the vehicle being only about one-half the usual width at this part.

The shafts 6 are swelled at their centers and connected by a circle-bar 7, as usual; but their rear portions are curved or dropped downwardly at 8, Fig. 1, and continued horizontally at 9, immediately above the wheels, and here they are connected to the outside portions of the front axle, thence bent inwardly across the tops of the wheels and connected to the back of the rear axle. This gives a very stable construction on account of the weight being disposed low, thus preventing overturning, while the parts more nearly approximate the true line of draft, which insures greater speed and ease of pulling. Furthermore, ample space is given for perfect freedom of movement by the animal. An important advantage gained by having the wheels, axles, &c., disposed closely together and within the shafts is freedom from interference with other sulkies when passing through a narrow space between two on opposite sides. The shafts being wider than the axles and wheels, the passage would be effected without their engaging or catching on the other vehicles. To prevent vibration and to strengthen the frame generally, I provide sets of stays 10.

The numeral 11 designates a fender or guard of wire, cloth, leather, or other suitable material, which is provided with straps at its front edge for buttoning to the circle-bar at 12. Adjustable straps 13 connect the lower corners of the guard to the stays 10, thus stretching it taut in an inclined position back of the circle-bar and in front of the driver, effectually protecting him from the dust and dirt thrown rearward by the animal. The connections being readily detachable, this guard can be easily removed when necessary.

My improved adjustable foot-rests 14 (illustrated in detail in Figs. 4 and 5) are located on the downwardly-curved portions 8 of the shafts a few inches below the seat. Being disposed back of the circle-bar and below the level of the seat, the driver's position is rendered secure and comfortable. Referring to Figs. 4 and 5, 15 designates a plate, having a longitudinally-disposed slot 16 and a depression 17 in its rear face. Above the slot is a row of numbered openings 18, spaced at regular distances—say one inch—apart. The curved foot-support 19, provided with the usual retaining-strap, is formed integral with a base 20, having a rib 21 and a lug 22. The rib is slidable in the slot and the lug adapted to enter any one of the openings. A locking-bolt 23, having its head received in depression 17 at the back of the plate, has its shank movable in the slot and passed through the base and provided with a nut 24. Upon loosening the nut the lug can be removed from the opening in which it was located and the foot-support and base slid along and locked at another point. Provision is thus made for adjustment to suit the leg length of the driver.

Having thus described my invention, what I claim as new, and desire to secure by Letters Patent, is—

1. In a sulky, the combination with wheels and upright front and rear axles, of shafts having their rear portions depressed or dropped in front of the wheels and connected to the axles immediately above the wheels.

2. In a sulky, the combination with wheels, and front and rear axles, of shafts of greater width at their widest part than the said axles and having their rear portions depressed or dropped and connected to the front axle outside the wheels immediately thereabove and crossed over said wheels and connected to the rear axle.

3. In a sulky, a foot-rest comprising a plate having a slot, a foot-support having a rib adapted to move in the slot, and means for locking the support to the plate at different points.

4. In a sulky, the combination with a plate having a slot and a row of depressions or openings, of a foot-support having a lug adapted to enter any one of the openings, and a locking-bolt on the foot-support which is received in the slot.

In testimony whereof I do affix my signature in presence of two witnesses.

MARTIN PAYNE.

Witnesses:
 JOHN W. RODDY,
 WILLIAM ISENBERGH.